United States Patent

Kanemitsu et al.

[11] Patent Number: 5,877,751
[45] Date of Patent: *Mar. 2, 1999

[54] TOUCH DISPLAY TYPE INFORMATION INPUT SYSTEM

[75] Inventors: Hiroyuki Kanemitsu, Susono; Kyomi Morimoto, Nishio; Yukiyoshi Suzuki, Okazaki; Kazuteru Maekawa, Aichi; Hitoshi Asano, Nagoya, all of Japan

[73] Assignee: Aisin AW Co., Ltd., Aichi-ken, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 909,765

[22] Filed: Aug. 12, 1997

Related U.S. Application Data

[63] Continuation of Ser. No. 483,176, Jun. 7, 1995, abandoned.

[30] Foreign Application Priority Data

Sep. 22, 1994 [JP] Japan ................................ 6-228466
Oct. 7, 1994 [JP] Japan ................................ 6-244373

[51] Int. Cl.[6] ................ G09G 5/00; B60Q 1/00; B60Q 1/48; G08G 1/123
[52] U.S. Cl. .......... 345/173; 345/178; 340/438; 340/932.2; 340/995
[58] Field of Search ................ 345/173, 178; 340/438, 932.2; 364/424.034

[56] References Cited

U.S. PATENT DOCUMENTS

| | | | |
|---|---|---|---|
| 4,523,188 | 6/1985 | Huber ................................ | 345/178 |
| 4,672,558 | 6/1987 | Beckes et al. ................... | 345/178 |
| 5,119,079 | 6/1992 | Hube et al. ..................... | 345/173 |
| 5,146,049 | 9/1992 | Shima ............................. | 345/173 |
| 5,266,931 | 11/1993 | Tanaka ........................... | 345/173 |
| 5,502,461 | 3/1996 | Okamoto et al. ............... | 345/173 |
| 5,539,429 | 7/1996 | Yano et al. ..................... | 345/173 |
| 5,565,894 | 10/1996 | Bates et al. ..................... | 345/178 |
| 5,638,060 | 6/1997 | Kataoka et al. ................. | 345/173 |

FOREIGN PATENT DOCUMENTS

| | | |
|---|---|---|
| A-0 171 365 | 2/1986 | European Pat. Off. . |
| A-0 476 972 | 3/1992 | European Pat. Off. . |
| A-40 33 832 | 6/1991 | Germany . |

OTHER PUBLICATIONS

IBM Technical Disclosure Bulletin, vol. 33, No. 10a, Mar. 1991, New York, USA, pp. 223–227, XP 000110024, "Algorithm for Decreasing the Error Rate of Data Entered on a Touch–Sensitive Terminal", entire document.

European Search Report.

*Primary Examiner*—Jeffery Brier
*Assistant Examiner*—David L. Lewis
*Attorney, Agent, or Firm*—Fish & Richardson PC

[57] ABSTRACT

A reaction area in a display can be enlarged from one directly above a switch display in the operator's eyesight direction. Specifically, the operator's position is determined from the driver's position or the like, and when the display is looked at to the right and upward, for instance, the reaction area is enlarged to the right and downward of a switch on the front side in the eyesight direction. Thus, operability can be improved in both cases when the display is looked at obliquely and diretly from the front.

12 Claims, 20 Drawing Sheets

SWITCH DISPLAY a    b

OVERALL STRUCTURE OF EMBODIMENT

STRUCTURE OF TOUCH PANEL

PROCESS IN CASE WHEN THERE IS SWITCH INCAPABLE OF USE

TOUCH DISPLAY TYPE INFORMATION INPUT SYSTEM

This application is a continuation of U.S. application Ser. No. 08/483,176, filed Jun. 7, 1995, now abandoned.

BACKGROUND OF THE INVENTION

1. Field of the Invention

This invention relates to a display touch type information input system for inputting operating information by detecting the touching of a switch displayed on screen.

2. Prior Art

Heretofore, radio sets, audio sets, air conditioners and many other accessory units which have no direct bearing on the running of vehicles have been mounted in vehicles, and there is a trend for an increasing number of these accessory units. Among these accessory units are navigation units, and vehicles with navigation units mounted therein are increasing in number.

The navigation unit serves to assist driving by displaying the present location on a map, and there are many navigation units which undertake route guidance by displaying the route to a destination when the destination is input.

Such a navigation unit requires a display for the map display. In addition, various operations are necessary for the input of the destination and other purposes. However, the space available within a vehicle is limited, and it is impossible to provide exclusive switches for respective necessary operations. Usually, therefore, the display surface is utilized as a touch switch panel, that is, it is utilized as a switch. Also, there are many cases in which the same display is utilized as a switch for operating an air conditioner, an audio set, etc., thus dispensing with some of the dedicated switches.

There are many different types of touch switch panel, such as an electrostatic capacitance type, an optical type, etc. In many cases, however, irrespective of the type of touch switch panel used, the touch detection area is slightly above the actual display surface.

For example, in the electrostatic capacitance type, use is made of deformation of a film provided on the display surface, and in the optical type blocking of light beam provided along the display surface is detected. Therefore, the actual detection area is above the display surface. This leads to a problem that an error is produced between a switch displayed on the display and the actual detection position.

Particularly, in the optical type an acrylic acid resin sheet for screen protection and an LCF (light control film) for suppressing reflection of light by the screen surface are provided between the switch display on the screen and a detection light beam. The thickness thus provided constitutes a corresponding distance between switch display and reaction point. In the optical type, therefore, the problem noted above is particularly pronounced.

Meanwhile, the display that is provided in the vehicle can not be disposed right directly in front of the driver's seat. That is, it has to be disposed at an intermediate position between the driver seat and the passenager seat. Inevitably, therefore, the driver's eyesight is directed obliquely with respect to the display. This leads to an error between the switch display on the display and directly above the touch reaction point (shown shaded), as shown in FIG. 1, and it is impossible to obtain correct detection of the driver's point of touch.

Japanese Utility Model Publication No. 121641/1987 shows precluding the deviation between display switch and reaction area due to a deviation of the driver's eyesight direction by shifting a switch display position (i.e., the whole display on the screen) according to the operator's position. Particularly, in a system disclosed in this publication seating detection switches are provided on the driver and passenger seats, and the switch display position is shifted by specifying the operator from the status of the seating detection switches. More specifically, when the driver alone is present, the display position is shifted to the left, while when both the driver and a passenger are present it is held at the center.

In this prior art example, however, sufficient improvement is not made because what is done is merely to shift the display itself. For example, there is such a problem that when the system is operated with the driver's face brought to the front right of the display, sufficient reaction can not be obtained due to a display deviation.

Particularly, while the touch of the touch switch panel is detected with respect to a plurality of spaced-apart reaction points, the reaction points can not be arranged very closely. Therefore, where a plurality of switches are displayed, the switch display may be comparatively small, and the number of reaction points of the switch display may be considerably small. By way of example, where the area defined by reaction points and the shape of switch display are in accord as shown in FIG. 2, the effect of the eyesight deviation is not so much. However, there is a case when the switch display and reaction points are deviated as shown in FIG. 3. In this example, while switches a and b are equal in size, the switch a is constituted by two reaction points, while the switch b is constituted by four reaction points. In such a case, if the eyesight direction is oblique with respect to the switch a, there is a high possibility that reaction points which do not belong to the switch a are operated by the driver's finger. If this is the case, sufficient reaction can not be obtained.

SUMMARY OF THE INVENTION

An object of the invention is to provide a screen touch type information input system, which can realize sufficient improvement in operability.

In the screen touch type information input system according to the invention, a reaction area corresponding to a display switch is enlarged from the consideration of the operator's eyesight direction. It is thus possible to increase the accuracy of detection of switch operation made by looking at the display obliquely, while maintaining the operability when the display is viewed from the front right thereof.

Further, it is possible to attain sufficient reaction area enlargement with respect to the eyesight direction in a range free from erroneous operation by determining the extent of enlargement from consideration of the distance between adjacent switch displays.

In a further aspect, in a screen display in a vehicle, there are switches which can not be operated during driving of the vehicle. When such a switch is present as an adjacent switch, the reaction are is enlarged to a somewhat greater extent from the consideration of this fact. Thus, it is possible to improve the switch operation recognition factor.

Further, reaction area enlargement in the case of the presence of a switch which can not be operated during driving of the vehicle, as an adjacent switch is made even when no consideration is given to the eyesight deviation. Again in this case, the switch operation recognition factor can be improved.

Further, where a switch operable in the parked state of a vehicle is always found on the eyesight direction side of an operated switch, the reaction area is effectively enlarged in the eyesight direction.

BRIEF DESCRIPTION OF THE DRAWINGS

FIG. 22 is a view showing a search condition confirmation display;

FIG. 23 is a view showing a passing point setting display;

FIG. 24 is a view showing another search condition confirmation display;

DETAILED DESCRIPTION OF THE PREFERRED EMBODIMENT

Figure 1:
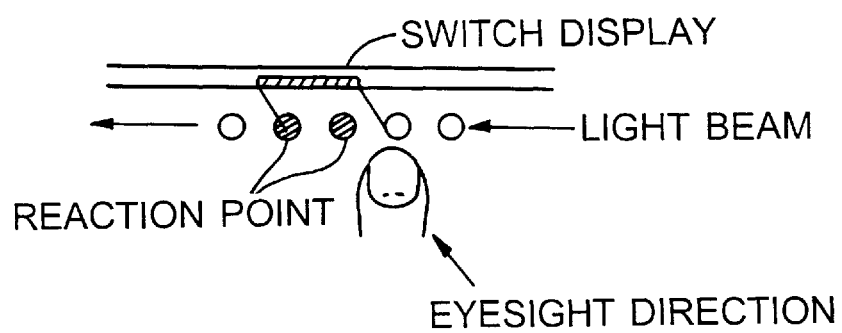
FIG. 1 is a view showing the relationship between eyesight direction and reaction points.
Figure 2:
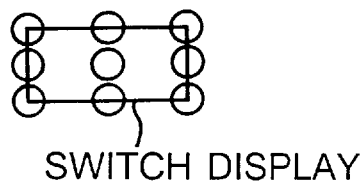
FIG. 2 is a view showing an example of the relationship between switch display and reaction points.
Figure 3:
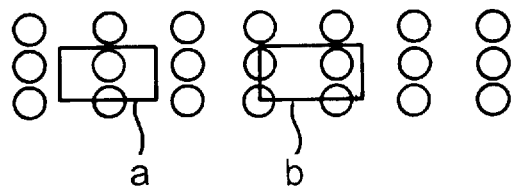
FIG. 3 is a view showing different examples of relationships between switch display and reaction points.
Figure 4:
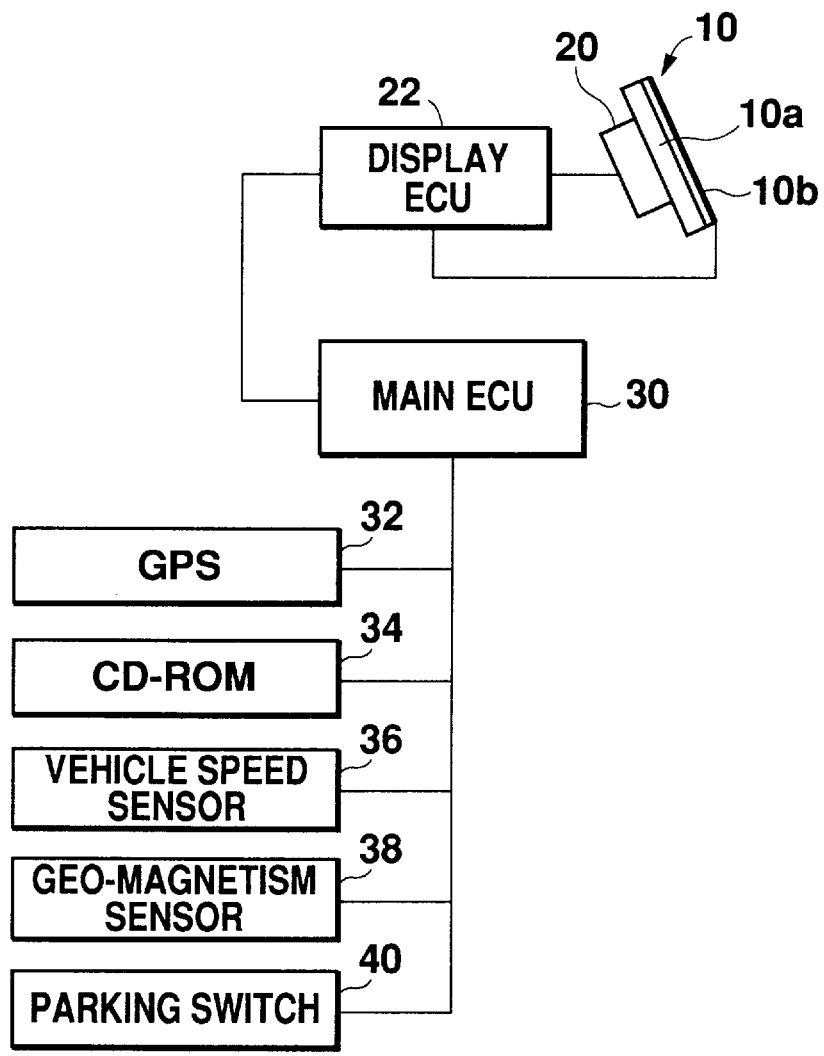
FIG. 4 is a block diagram showing an embodiment of the invention.

Now, an embodiment of the invention will be described with reference to the drawings. The overall structure of the embodiment is shown in the block diagram of FIG. 4.

As shown, the embodiment of the system comprises a touch panel 10, which includes an LCD display 10a and an optical touch panel 10b provided on the surface of the LCD display 10a. The LCD display 10a is connected via a driver 20 to a display ECU (electronic control unit) 22. The display ECU impresses a predetermined voltage via the driver 20 on liquid crystal of the LCD display 10a at a desired position thereof for display. The touch panel 10b is also connected to the display ECU 22, and it detects touch to some of the reaction points arranged in a matrix array.

A main ECU 30 is connected to the display ECU 22. According to a signal from the main ECU 30, the display ECU 22 determines the contents of display on the LCD display 22. In this embodiment, the main ECU 30 feeds an RGB signal (i.e., color television signal) about the display on the LCD display 10a, and according to this signal the display ECU 22 controls the voltage output of the driver 20 to obtain a desired color display. Meanwhile, on-off information (i.e., touch information) about the individual reaction points on the touch panel 10b is directly transmitted to the touch panel 10b. The main ECD 30 detects an on-off state of the display switch from the display on the LCD display 10a and reaction point on-off information.

In this embodiment, the display and touch detection are made on the display ECU. However, it is possible that such processes are executed by the main ECU 30. As a further alternative, a separate ECU may be provided, which executes only the processes of touch detection and judgment. As a yet further alternative, a logic circuit for touch judgment may be constructed by hardware.

To the main ECU 30 are connected a GPS (grobal positioning system) 32 for detecting the absolute position (i.e., latitude, altitude and height) of the vehicle by receiving radio waves from an artificial satellite, a CD-ROM 34 for reproducing optical disk with map information stored therein, a vehicle speed sensor 36 for detecting the running speed of the vehicle, a geo-magnetic sensor for detecting the bearing of the vehicle, and a parking switch 40 for detecting the parking state of the vehicle.

The main ECU 30 thus feeds signals concerning about display by determining the present position from the absolute position detected by the GPS 32 and covered distance obtained from the vehicle speed and geo-magnetism sensors 36 and 38, etc. and determining the content of display on the LCD display 10a from a map obtained from the CD-ROM 34, etc. Further, when displaying switches to be operated, the main ECU 30 determines the relationship between display switch and reaction points on the touch panel 10b. Further, a TV tuner is connected to the main ECU 22. It is thus possible to produce a TV display on the LCD display 10a. Further, it is possible to operate an air conditioner, etc. with the touch panel 10.

Figure 5:
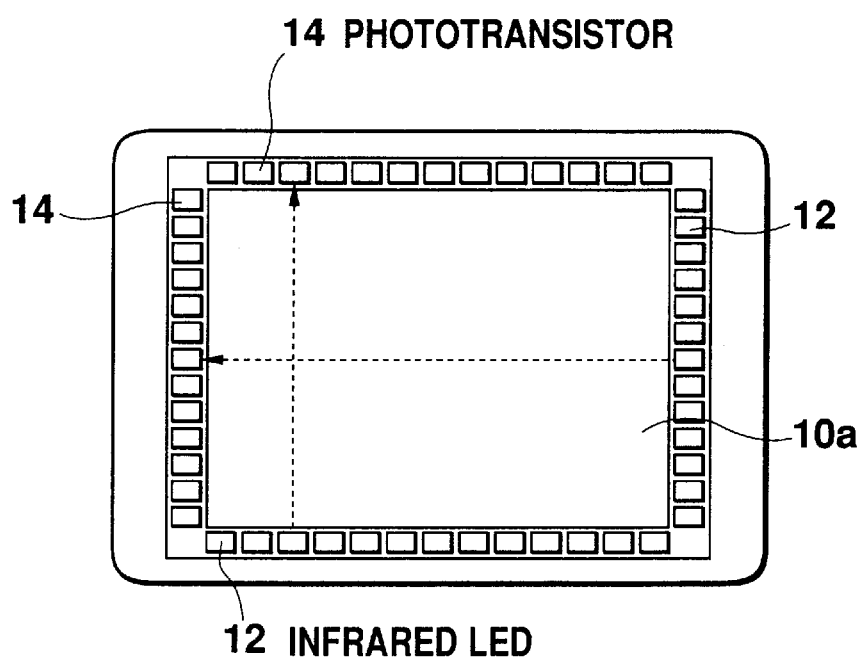
FIG. 5 is a view showing a touch panel.

The optical touch panel 10b in this embodiment is shown in FIG. 5. It has light-emitting and light-receiving element rows disposed around the LCD display 10a. More specifically, along the right and upper side of the LCD display 10a a plurality of infrared LEDs (light-emitting diodes) 12 are provided in a row. Along the left and upper sides a plurality of photo-transistors 14 are provided in a row. Infrared radiation from the light-emitting diodes 12 is thus received by the respectively opposing photo-transistors 14.

By touching the LCD display 10a with a finger, certain light beams are blocked by the finger. Two-dimensional coordinates of the finger are thus specified from the positions of the photo-transistors 14 which can no longer receive light.

Figure 6:
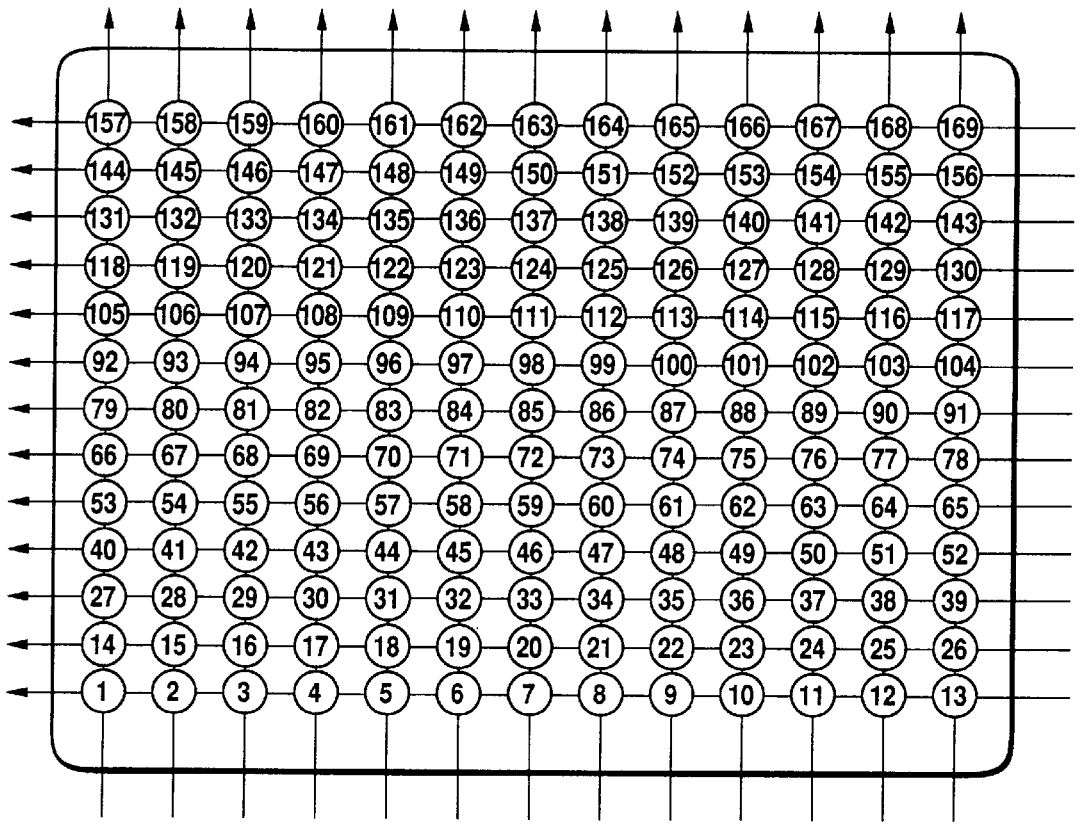
FIG. 6 is a view showing an array of reaction points in a touch panel.

Thus, the light-emitting diodes 12 and light-receiving transistors 14 form a matrix of a corresponding number of reaction points as shown in FIG. 6. In the example of FIG. 6, 13 by 13=169 reaction points are formed.

The main ECU 30 sets the reaction area of a switch displayed on the LCD display 10a in correspondence to the shape of the switch. It detects the touch to the reaction points in the reaction area to determine the on-off state of the switch.

Figure 7:
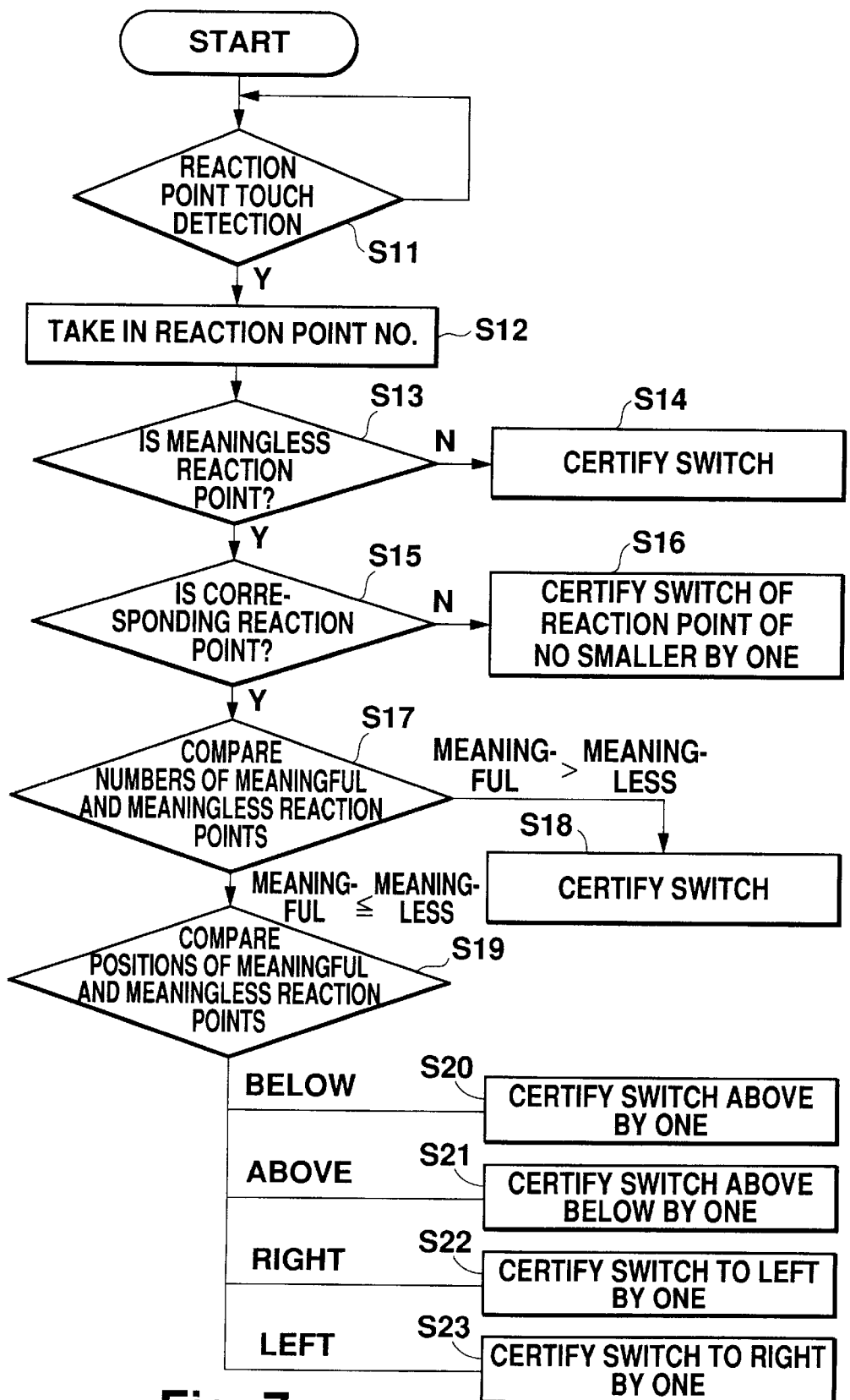
FIG. 7 is a flow chart illustrating the operation of the embodiment.

The detection of the on-off state of switch will now be described with reference to the flow chart of FIG. 7. In this example, the area directly above the display of the switch is set directly as a reaction area, and the reaction area is enlarged in the judging process.

First, when the touch panel 10b is touched in the presence of the switch display (step S11), the Nos. (1 to 169) of the touched reaction points are detected by the display ECU 22 and taken in to the main ECU 30 (step S12).

Then, the main ECU 30 checks whether there is any meaningless a reaction point (i.e., a reaction point not corresponding to any reaction area) (step S13). If no meaningless reaction point is found, it is determined that a switch corresponding to meaningful reaction point (i.e., reaction point corresponding to a reaction area) has been operated (step S14).

There is always one meaningless reaction point between two adjacent switches. Usually, there is no possibility that a reaction point corresponding to two switches will be touch in the absence of any meaningless reaction point. There may occur a converse state due to such cause as touching the touch panel 10 with two fingers. Such a state may be regarded to be an abornal switch operation or to be an absence of switch operation.

If a meaningless reaction point is found in the step S13, a check is made as to whether there is any reaction point in a reaction area corresponding to a switch (step S15).

If no such reaction point is detected, it is determined that a switch of a reaction area located at a reaction point of the No. smaller by one than that of the touched meaningless reaction point (i.e., a reaction point on the left side of the touched meaningless reaction point) has been touched (step S16). The left side reaction point is selected on the assumption that the operator is the driver seated in the right side seat. If it is known that preference is given to the left side seat, a switch of the No. larger by one (i.e., right side reaction point) may be determined. With the left end reaction point, this process is null because the reaction point with a No. smaller by one is on the right end. In many cases of usual operation, there is only a single switch located on the left side of a meaningless reaction point. When there are two or more such switches, the numbers of reaction points corresponding to these switches may be referred to for verification.

If it is found in the step S15 that there is a reaction point in a reaction area corresponding to a switch, the numbers of such reaction points and meaningless reaction points are compared (step S17). If the number of reaction points in the reaction area corresponding to the switch is greater, it is determined that the switch corresponding to these reaction points has been operated (step S18).

If it is found in the step S17 that the number of meaningless reaction points is greater, a check is made of the position relationship between the meaningless reaction points and the reaction area corresponding to the switch (step S19). According to the result of this check, switch operation is determined as follows. If the meaningless reaction points are located under a reaction area corresponding to a switch, it is determined that a switch immediately over the meaning reaction points has been operated (step S20). If the meaningless reaction points are located over the reaction area corresponding to a switch, it is determined that a switch immediately under the meaningless reaction points has been operated (step S21). If the meaningless reaction points are located on the right side of the reaction area corresponding to a switch, it is determined that a switch on the immediate left side of the meaningless reaction points has been operated (step S22). If the meaningless reaction points are located on the left side of the reaction area corresponding to a switch, it is determined that a switch on the immediate right side of the meaningless reaction points has been operated (step S23). The result of the check of the position relationship in the step S19 may be from a map or from operational processing of arithmetic formulas.

In the above way, the touch to a meaningless reaction point may be regarded to be the touch to a nearby reaction point. In the above flow, initially an area directly over a switch display was set directly as a reaction area, and the reaction area was changed when and only when the touch to a predetermined meaningless reaction point was detected. In this way, various reaction areas can be comparatively readily set. In addition, it is comparatively readily possible to set a reaction area afresh.

However, the main ECU 30 has internally memorized display switch positions, and it is possible to set a reaction area to an enlarged scale in advance. Further, it is possible to further enlarge a reaction area in the manner as shown in FIG. 7 as described at the time of detection of the touch to a meaningless reaction point in a check executed after the setting of the enlarged reaction area.

In the case of vehicles, the operator is usually the driver. Thus, the driver should be assumed to be the operator unless otherwise specified. In this case, it is effective to enlarge a reaction area not in all directions but in a particular direction only. In this case, reaction areas may be allotted to displayed switches as shown in FIGS. 8 to 10.

Figure 8:
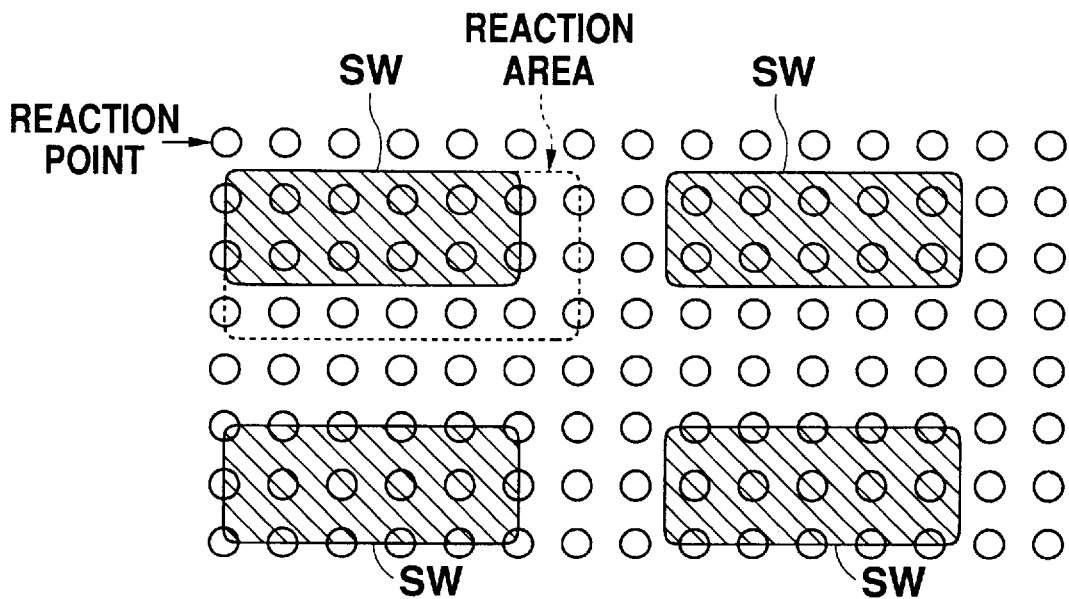
FIG. 8 is a view showing an example of enlarging a normal reaction area.

When the eyesight is directed from the right and downward with respect to the switch arrangement displayed on the LCD display 10a, as shown in FIG. 8, a reaction area is set which includes the entire top of the display switch and is enlarged to the right and downward. The touch of a reaction point in this reaction area is judged to be a switch operation. With such enlargement of the reaction area it is possible to preclude the error between the reaction points and the switch arrangement display when viewed from the operator, and the switch operation can be effectively detected. In addition, since the reaction area is merely enlarged, correct detection can also be obtained when the switch operation is made with the operator's face brought to the front of the screen.

Figure 9:
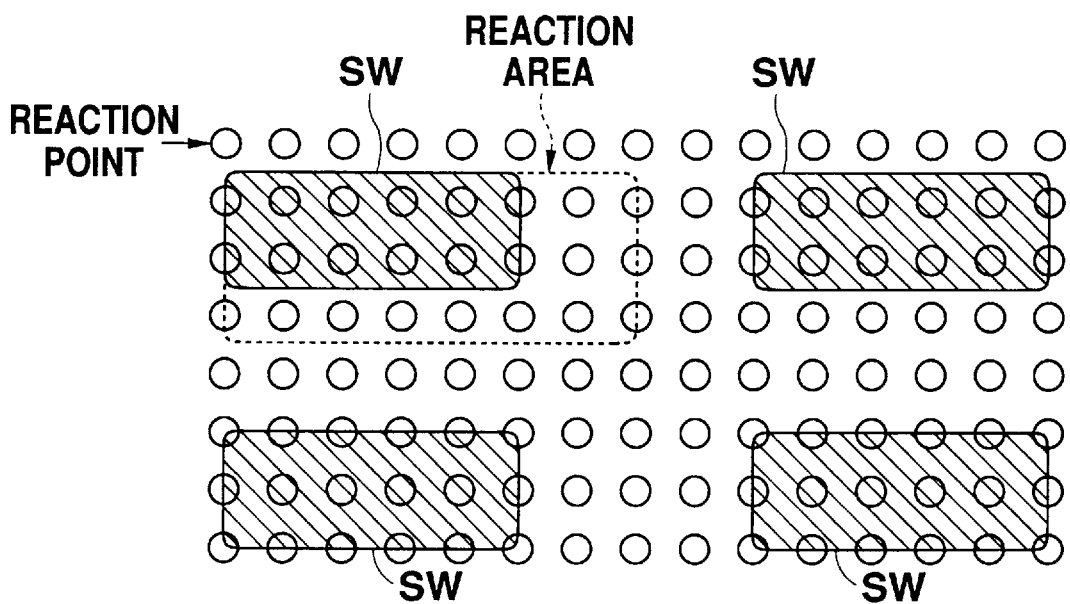
FIG. 9 is a view showing an example of enlarging a reaction area with consideration of inter-switch interval.
Figure 10:
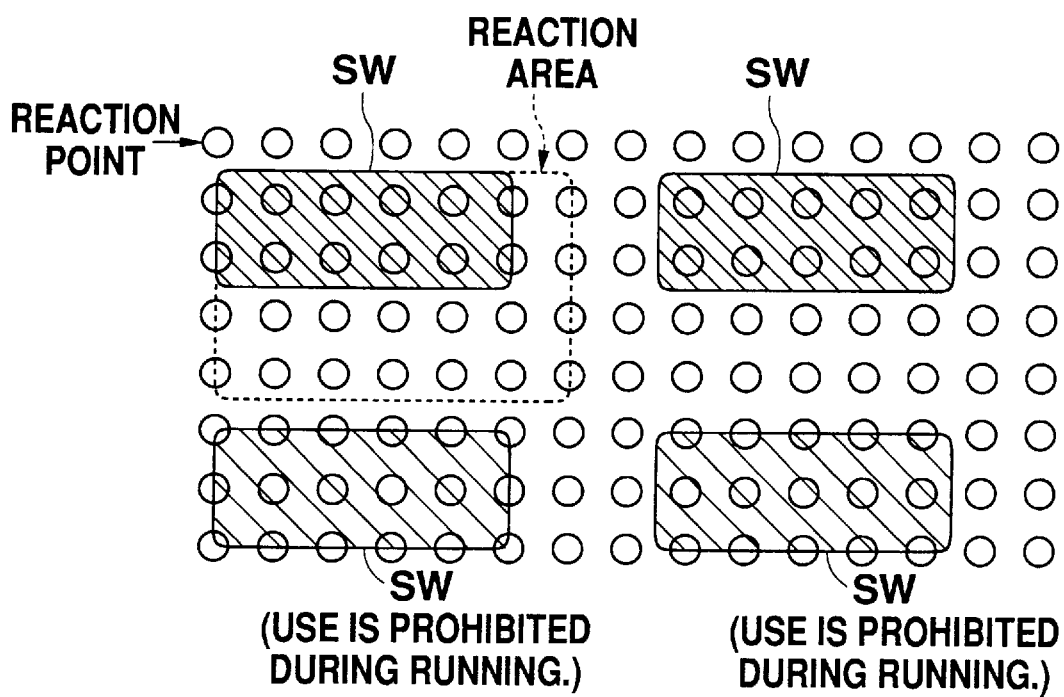
FIG. 10 is a view showing an example of enlarging an area in the case when the use of an adjacent switch is prohibited.

When the display switch interval is comparatively large as shown in FIG. 9, the enlarged reaction area is made greater according to the interval. This is done because the possibility of erroneous detection due to reaction area enlargement is low. By determining the extent of reaction area enlargement according to the display switch interval, the switch operation can be detected more effectively.

In a navigation display or the like, switches which can not be operated during driving are also displayed. In a specific example, the setting of a destination or the like is made according to the input of the kind of destination (such as department store, golfing place, station, etc.), address, telephone No., etc. Such an operation is comparatively complicated and is executed by watching the display. During driving of the vehicle, such a switch is displayed in thin form (as shown shaded in the Figures) so such as it can not be operated. If such a switch is operated, the operation is made null, while displaying a message that "the switch can not be operated during driving of the vehicle, so please use the switch after parking." Thus, with such a display the possibility of operating a switch which can not be operated is low.

Accordingly, in this embodiment the reaction area is further enlarged as shown in FIG. 10, so that the enlarged reaction area of the switch covers up to reaction points adjacent to a switch which can not be operated during driving of the vehicle.

More specifically, where two adjacent switches are operable, it is necessary to avoid erroneous judgment by setting at least one line of reaction points between the two switches, which reaction points belong to neither of the switches and are hence meaningless. However, if the adjacent switch is not operable, the switch operation recognition factor can be increased by allotting all the reaction points between the two switches to the reaction area of the operable switch.

Figure 11:
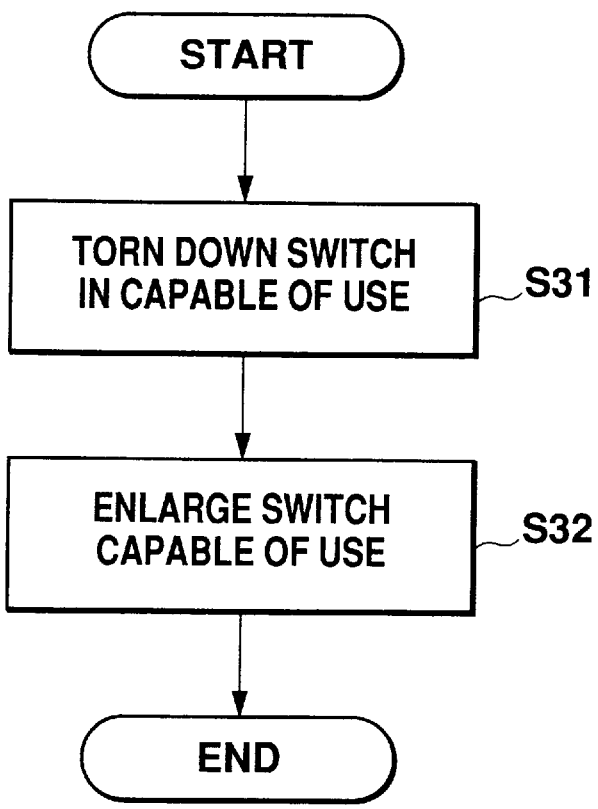
FIG. 11 is a flow chart illustrating operation in the case when there is a switch, the use of which is prohibited.
Figure 12:
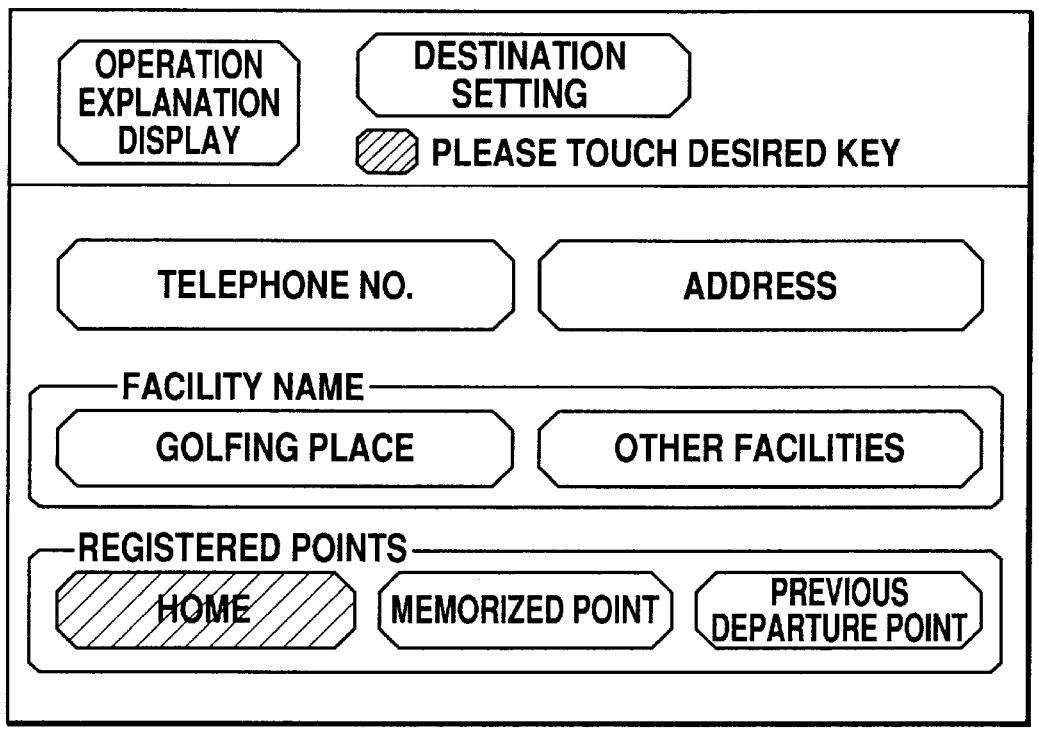
FIG. 12 is a view showing an example of display in the case when there is a switch, the use of which is prohibited.

Now, operation during driving of the vehicle will be described with reference to FIG. 11. When a destination display is produced by choosing a destination setting during driving, any inoperable switch is torn down (step S31). Specifically, of the display switches as shown in FIG. 12 the "TELEPHONE NO." switch for setting the destination from a telephone No., the "ADDRESS" switch for setting a destination from an address, facility name switches for setting a destination from a facility name, the "MEMORIZED POINT" switch for setting destination among memorized points, and a "PREVIOUS DEPARTURE POINT" switch are toned down. Thus, only the "HOME" switch is held operable without toning it down. (In the Figure, only the "HOME" switch is shown shaded). This is done because the destination can be set by merely touching the "HOME" switch, the operation being thus simple and capable of execution without any trouble during driving. Afterwards, the area covering the reaction points corresponding to the operable switch is enlarged (step S32).

The running state of the vehicle may be detected with reference to zero vehicle speed. In the case of an automatic vehicle, the parking position of a shift lever may be detected using a parking position switch 40. Further, the parking state of the vehicle may be detected through detection of an "on" state of the side brake. Further, the routine shown in FIG. 11 is called by an interrupt when the running state of the vehicle is detected.

In this embodiment, it is a presumption that the display itself is fixed. However, among various available displays are those which are capable of angle adjustment. That is, there are displays which can be directed toward the driver's seat in some cases and toward the passenger seat in other cases. With such a display, whether the operator is the driver or the passenger can be determined from the display installation angle. It is thus possible to provide a display position detector (which may detect rotation of the display as the display is usually rotated about its center line) and determine the reaction area enlargement direction by specifying the operator according to the result of detection.

The method of the operator's eyesight direction estimation is not limited to the above display angle adjustment, and the same effects are obtainable with other methods.

A conceivable different method, for instance, is such that an "PASSENGER SEAT OPERATION" key is displayed, and that if this key is touched, it is determined that the operator's eyesight direction is from the passenger seat.

(Description of another structural embodiment)

Now, another structural embodiment of the invention applied to a navigation system will be described. This structural example concerns a map call/display system for a navigation system, which can call and display maps concerning specified items of call.

Usually, driving carried out to various destinations. When utilizing a navigation system, it is accordingly necessary to input and set information about the destination. It is possible to memorize a place which recurrently constitutes the destination, such as home, place of work, etc. As for general destinations, however, it is necessary to set information whenever a specific destination is chosen. In the usual navigation system, a map of the neighborhood of a destination is called and displayed for determining the final destination when information of a place as an indication of for destination setting is input or for confirming destination when information of the final destination is input. For other purposes than the destination setting, it is possible to call and display desired maps by inputting place-specifying information.

A map may be called by specifying a facility name such as a golfing place name, a station name, etc., specifying a telephone No. or an address, or specifying a memorized place as noted before. Prior art navigation systems can call maps according to such input. As an example, when the home of an acquaintance which is located behind a certain golfing place is chosen as a destination, first the name of the golfing place is input as a facility name. Then, a map of the neighborhood of the golfing place is called and displayed. On the displayed map, the final destination is set, and a route search is made.

When setting a destination according to a telephone No. or an address, a pertinent map may be called and displayed by inputting comparatively rough information, such as a city name, an urban telephone exchange name, etc., and the final destination may be set on the displayed map.

However, a map which is called in the above way according to the input information may sometimes be of a scale which is not suited to the setting of the final destination. For example, the same scale of display is not suitable when calling a private shop having a small installation area and when calling a golfing place having a vast area. In other words, if the map showing the golfing place is called with a scale that permits adequate display of the private shop, the called map can not be contained within the screen.

According to Japanese Patent Laid-open Publication No. 94132/1993, if the called map can not be contained within the screen, this is displayed, and the direction in which the locality that can not be displayed is present is displayed with an arrow. In this case, it is made possible to scroll the screen in the direction of the arrow. Thus, when the called subject is not satisfactorily displayed, it is possible to permit observation of the whole subject. It is thus possible to permit the setting of destination or the like by utiliizing the called map.

In the above prior art example, however, it is necessary to scroll the display in order to observe the whole subject called. Therefore, the operability is inferior. For example, when setting a destination, scrolling of the display is needed to obtain information of nearby roads and so forth. Further, when the destination is an acquaintance's house behind a golfing place as noted above, difficulty may be encountered in the search of the destination due to absence of the intended location in the display or lack of the display of the whole golfing place.

The instant structural example seeks to solve the above problems.

Figure 13:
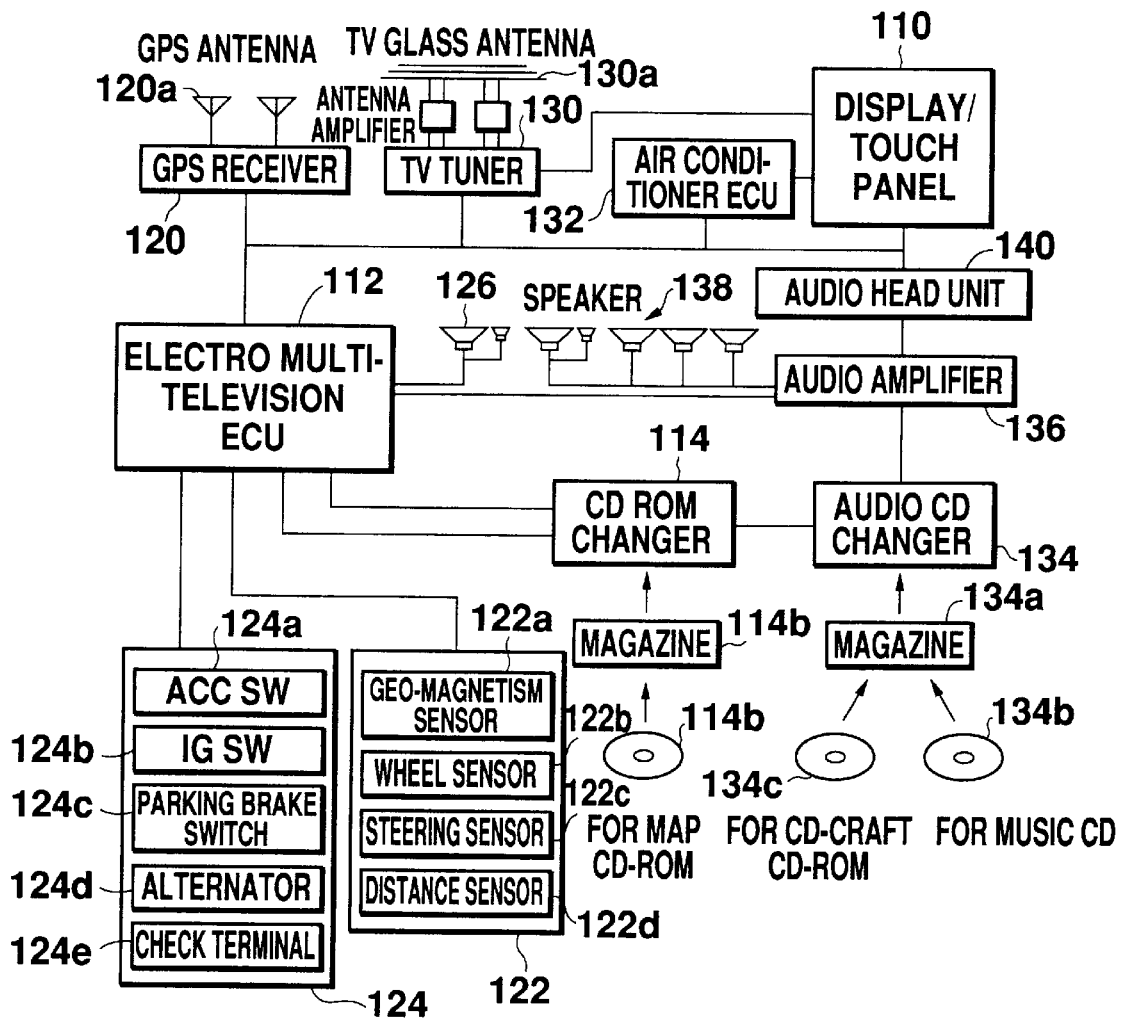
FIG. 13 is a schematic showing the entire system structure.

FIG. 13 is a schematic showing the entire structure of the example of a map call/display system. A display/touch system 110 as shown serves as map display means.

It includes an LCD (liquid crystal display) and a touch panel provided on the surface of the LCD. In addition to displaying various maps, it also has a role of detecting the touching of a displayed switch. An electro multi-television ECU 112 is connected to the dislay/touch panel 110. The electro multi-television ECU 112 has roles of providing displays and detecting the touching of the touch panel. A CD-ROM changer 114 is connected to the electro multi-television ECU 112. A map CD-ROM 114b is connected via magazine 114a to the CD-ROM changer 114. The map CD-ROM 114b serves as memory means for storing map data. The electro multi-television ECU 112 serves as map call means for obtaining desired map information from the CD-ROM changer 114.

A GPS receiver 120 is connected to the electro multi-television ECU 112. The GPS receiver 120 receives signals from an artificial satellite via a GPS antenna 120a to detect the absolute position (altitude and latitude) of the vehicle and supplies detection data to the electro muilti-television ECU 112. The absolute position of the vehicle can thus be detected in the electro multi-television ECU 112. Various sensors 122 for detecting the running state of the vehicle are connected to the electro multi-television ECU 112. The running condition thus can be ascertained at all times. In this example, the sensors 122 are a geo-magnetism sensor 122a, a wheel sensor 122b, a steering sensor 122d and a distance sensor 122d. The electro multi-television ECU 112 can thus grasp the bearing, speed and steering angle of the vehicle and distance covered thereby from the results of detection by the sensors 122. The electro multi-television ECU always calculates the present position from the detection signals from the sensors 122, and makes higher accuracy detection of the present position by combining the result of detection from the GPS receiver 20 with the calculated present position.

The electro multi-television ECU 112 is further supplied with detection signals from various switches 124. In this example, signals from an accessory switch 122a, an ignition switch 124b, a parking brake switch 124c, an alternator 124d and a check terminal 124e are supplied to the electro multi-television ECU 122. Thus, the electro multi-television ECU 112 can ascertain running conditions of the vehicle, such as whether the ignition key is "on", whether the vehicle is parked with the parking brake operated, whether the electricity generation state is satisfactory, and whether various accessories mounted in the vehicle are normal.

Further, a loudspeaker 126 is connected to the electro multi-television ECU 112. A guidance voice for route guidance is output from the loundspeaker 126.

Further, in this system a TV tuner 130 is provided to permit display of a television signal intercepted by a TV antenna 130a built into the window glass on the screen of the display/touch panel 110. An air conditioner ECU 132 is further connected to the display/touch panel 110.

The air conditioner can thus be operated by a switch displayed on the display/touch panel 110.

Further, the system includes an audio CD changer 134b for reproducing data from a CD-ROM 134c. CD-ROM 134c data for sight-seeing guides, etc. is stored.

Thus, video data can be supplied from the CD-ROM 134c to the electro multi-television ECU 112 to display sight-seeing guide displays on the display/touch panel 110. Further, voice data from a music CD 134b and CD-ROM 134c can be supplied through an audio amplifier 136 to loudspeakers 138 to output predetermined voices. Further, an audio head unit 140 is connected to the audio amplifier 136 to permit signals from an FM radio unit, an AM radio unit, etc. to be output to the loudspeakers 38.

Figure 14:
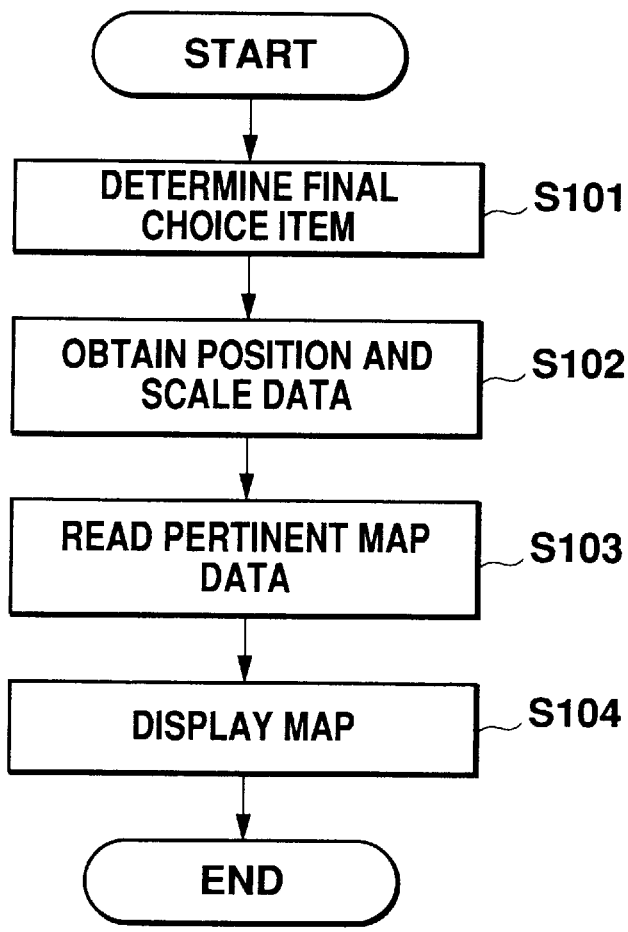
FIG. 14 is a flow chart illustrating the operation of the embodimentt.

Now, the above system will be described in connection with reading out a map for destination setting with reference to FIG. 14. In this case, information for the destination setting is first input by operating the display/touch panel 110. As an example, it is assumed that the destination is set according to an address. For example, information "Toyoda City, Akita Prefecture" is input, and it is determied to be the final choice item (step S101).

According to this input, the electro multi-television ECU 112 determines the center position of the input "Toyoda City" and the scale of the display from data stored in the map CD-ROM 114b (step S102). As the center position adopted may be the center position of the area (i.e., administrative area) of Toyoda City, the location of the administrative office of the city, etc. The scale of the display has been determined from the area and shape of the pertinent city (i.e., Toyoda City in this case), and this information has been stored. When displaying the area, a scale is required which permits maximum enlargement of the area without a non-display portion. This data is stored together with data of the item (i.e., Toyoda City in this case) in the CD-ROM 114b.

When the final choice item is determined in the step S101, the data has already been read out from the CD-ROM 114b into a memory of the electro multi-television ECU 112.

Figure 15:
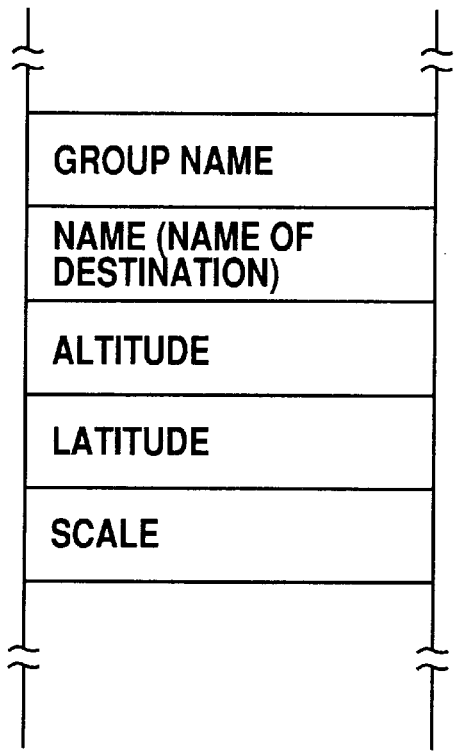
FIG. 15 is a view showing a storage state of a memory.

An example of the configuration of this data is shown in FIG. 15. As shown, the group name, name (i.e., kanji name in the case of a Japanese name), altitude and latitude of the destination and the scale of the display are stored. As the scale of display one is stored which is best suited, in both the altitude and latitude scales to the display of the area as described above. The group is the kind of item, such as golfing place, amusement park, etc. (corresponding to the facility name), and it represents the kind of call subject together with the name. In this way, the scale of display is stored in the CD-ROM as shown in FIG. 15. However, it is also possible to provide a ROM in the ECU 112 and store a table listing call subject kinds and display scales in one-to-one correspondence in the ROM. In this case, the data amount in the CD-ROM 114b may be reduced.

Since the center position of display and the display scale are determined in the above way, the pertinent map data are read out (step S103). The read-out map data are displayed on the display/touch panel (step S104).

As shown, in this example the best suited display scale is determined according to the kind of final choice item as determined in the step S101. If the final choice item determined in the step S101 is not at the level of city, town or village but specifies the address, the display scale is determined under the assumption that the area of the pertinent address is to be displayed. If an urban telephone exchange No. or a golfing place name is specified, a display scale corresponding to the final choice item is read out. Thus, the map call is always made on the basis of the best display scale, and the best map display is carried out.

For example, if a golfing place is displayed on a map with a scale of 1/100,000, it is partly displayed on the screen. When such a display is provided, the operator wishes to search for a desired place, for instance a club house parking area, in the golfing place. Previously, if the club house parking area be found correctly, the destination could be set correctly.

However, if the destination could not be found, it would be set to be a different place, for instance a parking area on the opposite side of the club house. Meanwhile, in this navigation system, when merely the name of the golfing place is specified, the destination is usually set to be the club house parking area which the general driver decides to be the destination. This means that by setting the destination directly on the display, correct destination setting can be obtained. In this example, the golfing place as a destination is set in an optimum size, i.e., a size which is not excessively large or small.

The destination setting can thus be completed at a level intending to find golfing place. In other words, the destination setting can be obtained without a change in the predetermined club house position. In this way, in this example correct destination setting can be obtained.

It will be seen that there is a correlation between the display scale and the operator's sense. When the operator wishesdesires to obtain display of a map in a certain scale, he or she obtains information which is available from that scale. In other words, for a detailed map detailed information is sought, while for a broad area map only a very rough positional relationship is sought. Thus, by obtaining display of a map in a scale adequate for the size and shape of the subject as in this example, the operator can confirm only the presence of the pertinent facility or the like, and he or she can promptly carry out correct destination setting without the need to set greater details.

Now, the actual operation of the navigation system will be described with reference to display examples. It is assumed that the set destination is among "OTHER FACILITIES" and that a point is set which has been set in advance as a memorized point on the route to the destination.

(Setting of Destination)

Figure 16:
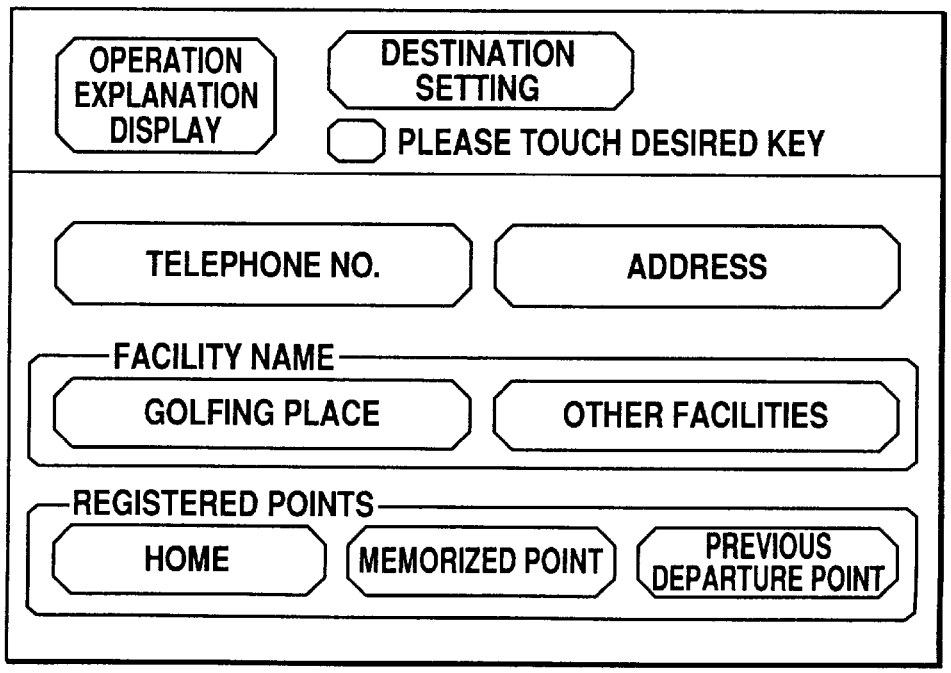
FIG. 16 is a view showing a destination setting method choice display.
Figure 17:
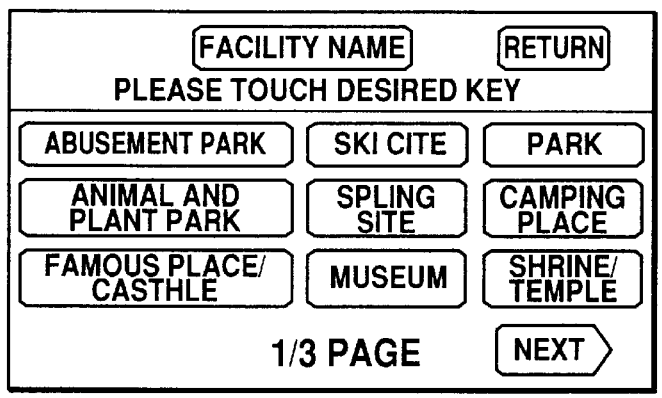
FIG. 17 is a view showing a facility name choice display.
Figure 18:
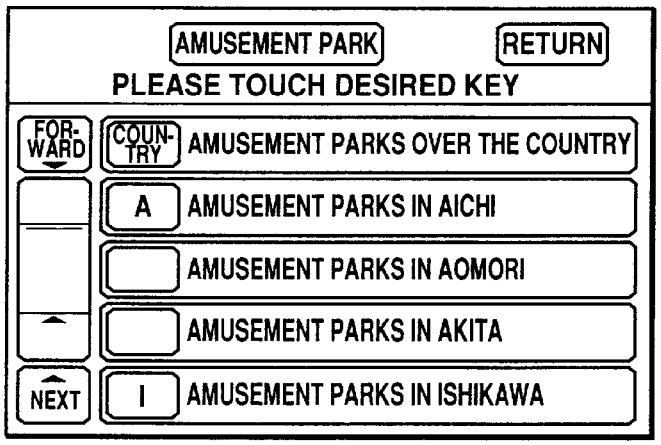
FIG. 18 is a view showing a prefectural district list display.

FIG. 16 shows a display for choosing a method of destination setting. As shown, the display includes "TELEPHONE NO." and "ADDRESS" keys. It also includes "GOLFING PLACE" and "OTHER FACILITIES" keys for facility names (or groups). It further includes "HOME", "MEMORIZED POINT" and "PREVIOUS DEPARTURE POINT" keys for registered points. When this display is provided, a navigation message saying "You can call and set a map of destination neighborhood from telephone No. or facility name." is produced. In this example, the "OTHER FACILITIES" key is touched. As a result, a destination facility name choice display as shown in FIG. 17 is provided. At this time, a navigation message saying "Please choose destination facility name." is also produced. The operator thus chooses and touches a desired key among "AMUSEMENT PARK", "SKIING PLACE", etc. keys. As a result, a prefectural district list display as shown in FIG. 18 is provided. At this time, a navigation message saying "Please choose prefecture name corresponding to destination." is produced. In this example, the "AMUSEMENT PARK" key is touched as facility name.

In this display, the prefectural district containing the pertinent amusement park is determined by touching a corresponding prefectural district key. (In the United States of America, the prefectural districts would be comparatively broad areas corresponding to the states.) The first prefectural district display part in the display has a "COUNTRY" key.

Figure 19:
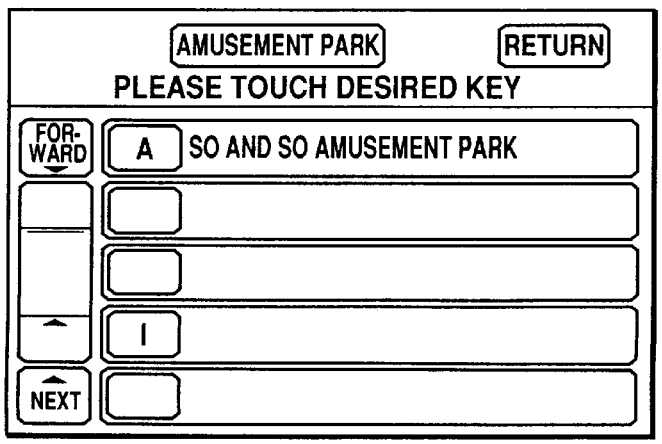
FIG. 19 is a view showing a facility list dislay.
Figure 20:
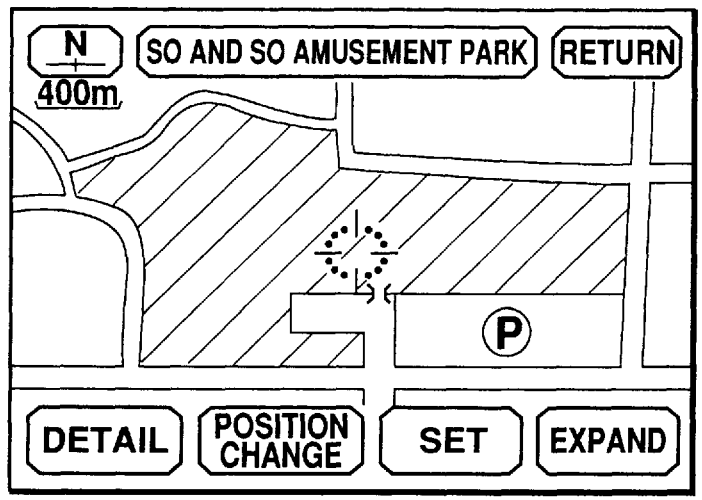
FIG. 20 is a view showing a facility neighborhood map display.

By touching this key, a display is provided in which the facilities all over the country are listed, while producing a navigation message saying "Please chose destination name, and you can call a neighborhood map." On this list display, a desired one of the facilities all over the country can be chosen. When a prefectural district is chosen, a facility choise display as shown in FIG. 19 is provided, which shows a list of amusement parks in the chosen prefectural district. On this list display, a desired facility is chosen. As a result, a map of the neighborhood of the chosen facility as shown in FIG. 20 is displayed, while a navigation message is produced which says "Please touch "SET" key, and you can set destination." By touching the "SET" key, the destination is set. In this example, the best map scale for display is stored as shown in FIG. 15 in correspondence to the area and shape of the specified facility (i.e., amusement park in this case). Thus, the called map is in the best scale, and the whole amusement park and the neighborhood thereof are displayed on the screen. By touching the "SET" key on the display shown in FIG. 20, the destination is set as the amusement park. The actual destination that is set is a parking area which is closest to the front gate of the amusement park which is usually set as a target.

Meanwhile, by touching the "POSITION CHANGE" key, eight arrow keys radially spaced-apart are displayed. At this time, a navigation message saying "Map is moved by touching an arrow, and destination can be set by touching "SET" key." is produced. When the operator touches, for instance, the upwardly directed arrow key, the destination can be moved to the north from the parking area at the front gate. Then, by touching the "SET" key at a desired point, the destination setting can be obtained. There may be cases when setting the destination from a telephone No that there is no pertinent facility but there is only a pertinent urban telephone exchange. In such a case, the pertinent map can be displayed, and a "SEARCH NEIGHBORHOOD" key can also be displayed. By touching the "SEARCH NEIGHBORHOOD" key, such item as the name of a town, intersection, etc. near the destination can be displayed. From this display, a pertinent neighborhood map can be searched for destination setting.

Figure 21:
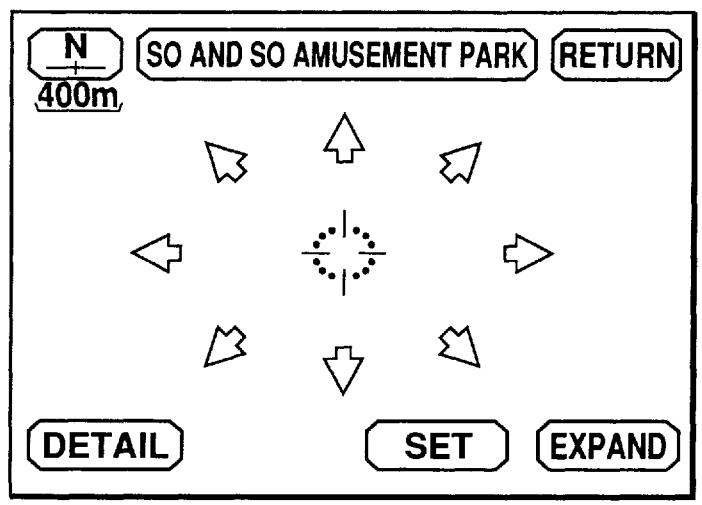
FIG. 21 is a view showing a position change display.

When the map is displayed, the destination setting is completed by touching the "SET" key. When the destination setting is completed, data of roads near the destination or the like are confirmed. If there is no problem, a search condition confirmation display is provided for search up to the destination. Meanwhile, if there is no nearby road or the like suited for navigation after the destination setting, such a display message as "No road suited for navigation is found, so please operate again after moving the destination point to the vicinity of a trunk road" is provided. Then, an arrow mark display like that shown in FIG. 21 is provided for re-setting of the destination.

(Setting of Search Conditions)

Figures 22, 23, 24:
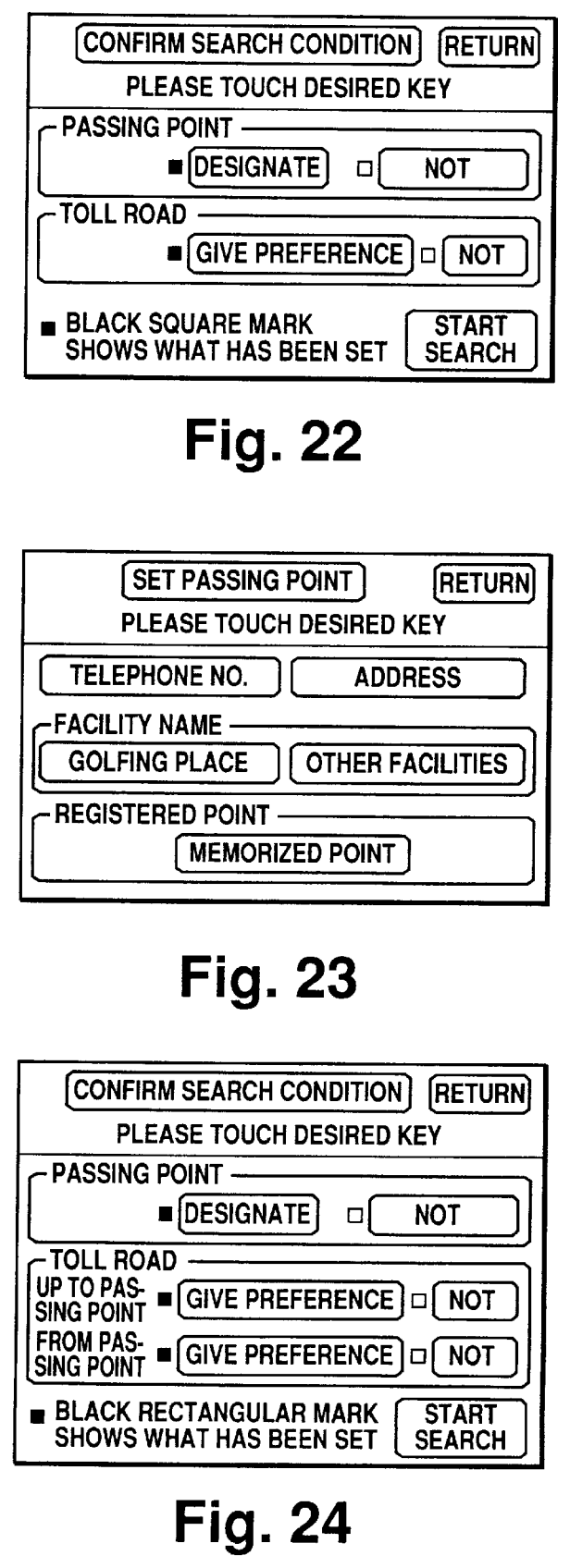

When the destination setting is completed in the above way, a search condition confirmation display as shown in FIG. 22 is provided. At this time, a navigation message saying "Touch "SEARCH START" key, and search of route up to destination will be started on condition that preference is given to toll road." is produced. On this display, whether or not there is a designated passing point is set. Also, setting as to whether or not preference is given to a toll road is made.

If preference is to be given to a toll road in the choice of road up to the destination, a "GIVE PREFERENCE" key is touched. Otherwise, a "GIVE NO PREFERENCE" key is touched. In this way, a choice is made as to whether or not preference is to be given to a toll road.

In addition, whether or not a passing point is to be designated on the route up to the destination is chosen by key touch. When a passing point is designated, a best route passing through that point before reaching the destination is chosen in the route search.

Specifically, by touching a "DESIGNATE" key, a passing point setting choice display as shown in FIG. 23 is provided. This display resembles that for the destination setting.

Thus, the passing point can be set in a manner similar to the destination setting as described above. When the passing point setting operation is ended, the "SET" key on the display is touched. Thus, the setting of the passing point is completed, and data of the vicinity of the passing point can be confirmed. Then, a search condition choice confirmation display as shown in FIG. 24 is provided. Here, route search is started by touching a "START SEARCH" key.

(Route Search)

Figure 25:
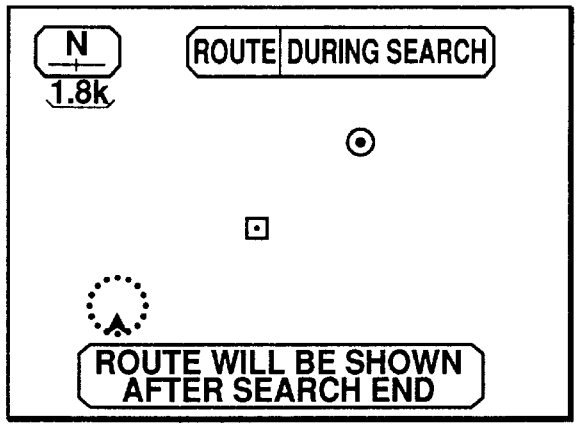
FIG. 25 is a view showing a route search state display.
Figure 26:
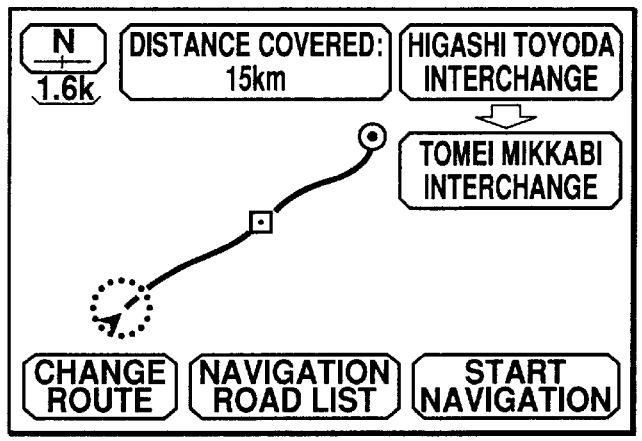
FIG. 26 is a view showing a whole route guide display.

When the "START SEARCH" key as shown in FIG. 24 is touched, a display as shown in FIG. 25 is provided for route search. When the route search is ended, the whole route from the present point to the destination is displayed on map. At the same time, the entire distance (in km) to be covered is displayed as shown in FIG. 26. At this time, it is informed by navigation message that navigation along a route passing through the designated passing point will be made. When it is found as a result of the search that the destination is near the present point, this is displayed, and it is instructed to drive the vehicle with reference to a map. When a point at which a route search can be made is reached, a "SEARCH" key is displayed. When this "SEARCH" key is touched, a navigation route search is made. Further, during the navigation route search a present position display can be provided by depressing a present position switch. It is thus possible to confirm the present position during the navigation. When the search is ended, the whole route and the entire distance to be covered are displayed by touching "DISPLAY ROUTE" key.

If the navigation route search could not be made, this is displayed, and also a "CON FIRM" key is displayed. Then, by touching the "CONFIRM" key, a present position display is provided. By touching the "SEARCH" key after departure and after running past the displayed present position, the navigation route search is started again. In other words, if there was no road suitable for navigation near the present position, this fact is displayed, and it is instructed to carry out a search again in the neighborhood of a trunk road. If the route search could not be made any reason other than a problem with a road in the vicinity of the present position, merely the fact that the route search could not be made is displayed, and it is instructed to undertake the operation afresh.

(Route Guidance)

Figure 27:
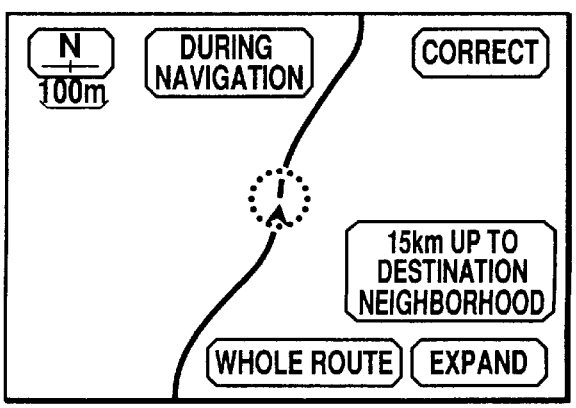
FIG. 27 is a view showing a route guide state display.

After the whole route and the entire distance (in km) to be covered have been displayed after the end of the route search, route navigation up to the destination is started by touching a "START NAVIGATION" key on the display or after 15 seconds of running. That is, a route navigation display as shown in FIG. 27 is provided at this time.

As shown, the display includes a present position mark shown at the center of the display. Also, a "DURING NAVIGATION" display is provided in an upper portion of the display.

Further, the vicinity of the passing point (only when the passing point has been set) and the distance to be covered up to the destination neighborhood arc displayed in a right lower portion of the display.

Figure 28:
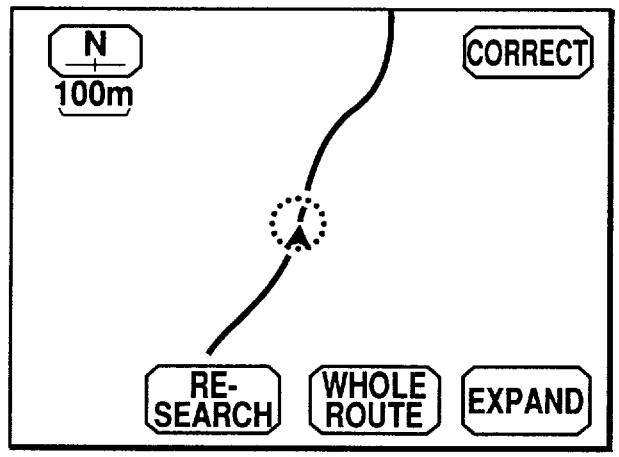
FIG. 28 is a view showing a guide display in the case of departure from the route.

If it is judged during running that the vehicle position is deviated from the navigation route, the "DURING NAVIGATION" display is removed, and a "RE-SEARCH" key is displayed in a lower portion of the display as shown in FIG. 28. By touching this "RE-SEARCH" key, the route search can be made afresh.

Further, by touching a "WHOLE ROUTE" key on the route navigation display, the whole navigation route from the present position to the destination is displayed. The display of the whole navigation route is similar to the display shown in FIG. 26. In this case, however, a "RESUME NAVIGATION" key is displayed in lieu of the "START NAVIGATION" key. By touching this "RESUME NAVIGATION" key, the usual navigation display is restored.

(Intersection Guidance)

Figure 29:
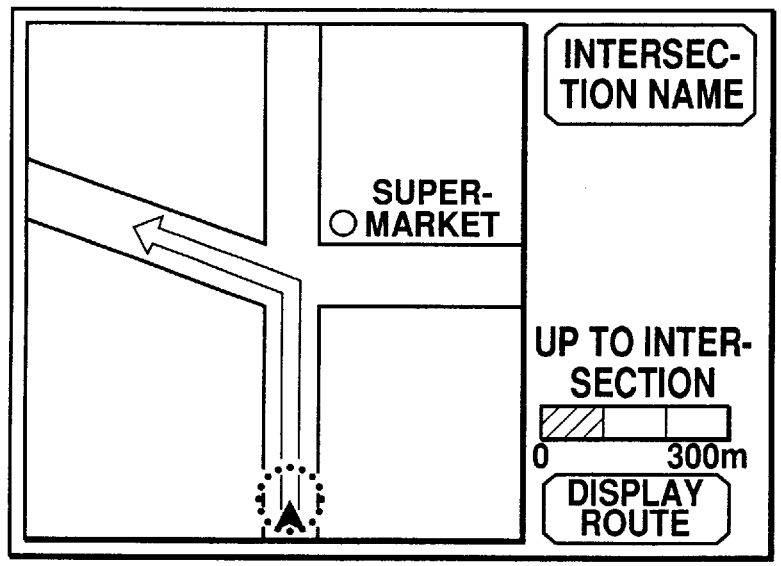
FIG. 29 is a view showing an enlarged-scale intersection neighborhood display.

When an intersection is approached during route navigation, it is detected, and an enlarged-scale display of the vicinity of the intersection is provided for navigation. More specifically, when an intersection is approached by the vehicle, this approach is detected, and an enlarged-scale intersection vicinity display as shown in FIG. 29 is provided. Also, the direction of proceeding along the navigation route is informed by a navigation message. That is, a navigation message saying, for instance, "Please turn to the left at so and so intersection about 300 meters ahead." is output. By touching the "DISPLAY ROUTE" key on the enlarged-scale intersection vicinity display, the usual route navigation display is provided. This display includes an "INTERSECTION" key display. By touching this "DISPLAY INTERSECTION" key, the enlarged-scale intersection vicinity display can be restored. When it is detected that the navigated intersection has been passed, the usual route navigation navigation display is restored.

(Route List)

It is possible to display the navigation route from the present position to the destination in the form of a list. Also, it is possible to display a map showing the vicinity of each point on the navigation route.

Figure 30:
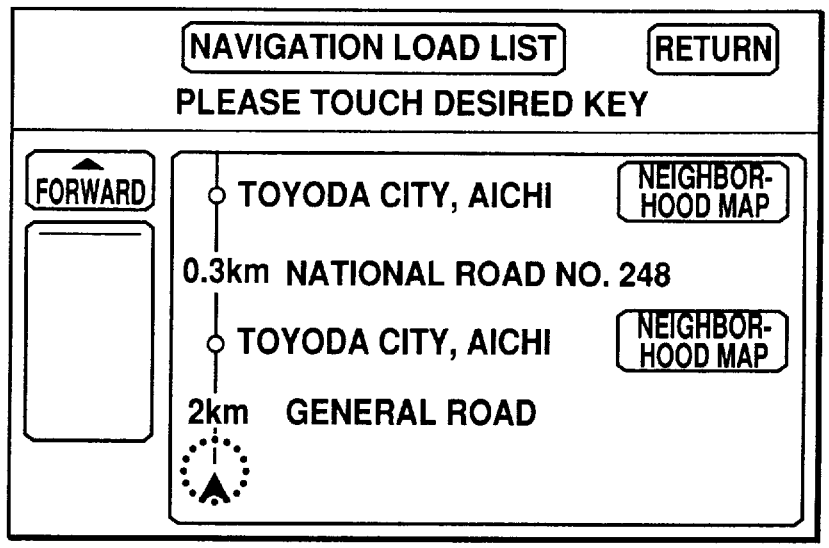
FIG. 30 is a view showing a guide road list display.

A display showing the whole navigation route from the present position to the destination has a "NAVIGATION ROAD LIST" key display. By touching this "NAVIGATION ROAD LIST" key, a display showing a navigation route list from the present position to the destination is provided. That is, a display showing the roads extending from the present position to the destination as shown in FIG. 30 is provided. In this display, the navigation route is divided at points of change in road type or at interchanges or junctions where roads are entered or left. Also, the distances between adjacent points noted above are shown as actual distances. If the route from the present position to the destination can not be shown on the same display, the display can be scrolled with "FORWARD" and "BACKWARD" keys (only the "FORWARD" key being shown in the Figure). In this way, a display of the whole route up to the destination can be obtained.

Further, by touching a "SURROUNDING AREA" key which is provided outside the navigation route list display and on one side of each of the points noted above, a map centered on that point is displayed. This display has eight arrow keys corresponding to respective directions, and map movement can be made by using these keys.

(Route Re-search)

When the navigation route is deviated from the present position on the route navigation display, it is possible to carry out navigation route re-search and display a new navigation route.

More specifically, if it is judged that the position of the running vehicle has been deviated from the navigation route while the route navigation display is provided, as described before, the "DURING NAVIGATION" display is removed, and a "RE-SEARCH" key is displayed on a lower portion of the display. By touching this "RE-SEARCH" key, a new route in the vicinity of the present position is searched. When the re-search is ended, the new navigation route from the vicinity of the present position is displayed. If the re-search could not be made, the previous navigation route is displayed again. At this time, a navigation message saying "New route could not be found, so the previous route will be displayed." is output. Also, this content is displayed.

The re-search which is instigated by touching the "RE-SEARCH" key, is a search of a route from the present position to a navigation route which has already been searched.

During the route search up to this navigation route, a "SEARCH WHOLE ROUTE" key is displayed. By touching this "SEARCH WHOLE ROUTE" key, an entire new route from the present position to the destination is searched. When the search is ended, the whole new navigation route is displayed. The display of this whole new navigation route is like the case when a route search is carried out by setting the destination. Further, when a passing point has been set at the time of the re-search, an "ERASE PASSING POINT" key is displayed simultaneously with the "SEARCH WHOLE ROUTE" key. By touching this "ERASE PASSING POINT" key, a search of a whole new route without any designated passing point is made. When the search of the whole new route after erasing of the passing point is ended, the whole new route without any designated passing point is displayed.

(Route Change)

Figure 31:
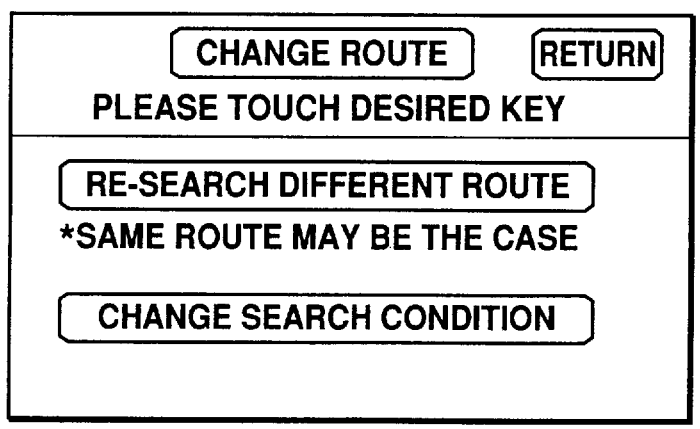
FIG. 31 is a view showing a route change display.

After the end of the navigation route search, the navigation route or search condition may be changed. The whole route display (see FIG. 26) after the end of the navigation route search has a "CHANGE ROUTE" key display. By touching this "CHANGE ROUTE" key, a route change choice display as shown in FIG. 31 is provided.

This display has a "RE-SEARCH TO SET DIFFERENT ROUTE" key. By touching this key, a whole new navigation route is searched. When the search is ended, the whole new navigation route is displayed. When the result of the search is the same as before the navigation route change, the navigation route before the navigation route change is restored.

The route change choice display also has a "CHANGE SEARCH CONDITION" key. By touching this key, a search condition confirmation display is provided. In this case, it is possible to change the setting of any designated passing point and also to change the setting as to whether or not preference is to be given to toll roads. Further, it is possible to change the setting so as to make a further change of the navigation route.

In the presence of the route navigation display, it is possible to correct the navigation route with a change in the present position and also to correct the navigation route from toll road to general road or from general road to toll road. More specifically, by touching a "CORRECT" key on the route navigation display, a route correction display is provided.

Figure 32:
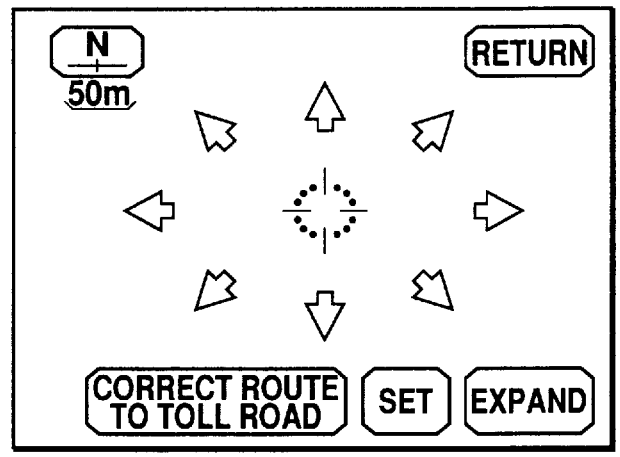
FIG. 32 is a view showing a route correction display.

This display, as shown in FIG. 32, has eight direction arrow keys for correcting the present position. By touching these keys the present position is changed to a new position desired on a separate route. Then a "SET" key is touched. As a result, the present position is changed, and a new navigation route from the changed position is displayed.

When a toll road is set as part of the navigation route along which the vehicle is to run, a "CORRECT ROUTE TO GENERAL ROAD" key is displayed on the route correction display. This key is touched if it is desired to use an ordinary road instead of the toll road. As a result, the route is corrected to a new one using ordinary roads only. If ordinary roads only is set as the navigation road along which the vehicle is to run, a "CORRECT ROUTE TO TOLL ROAD" key is displayed on the route correction display. This key is touched if it is desired to use toll roads. As a result, the route is corrected to a new one using toll roads.

(Navigation concerning Arrival at Designated Passing Point)

When the vicinity of a designated passing point is approached in the presence of a route navigation display with the designated passing point, it is informed by a navigation message that the present position is near the designated passing point. That is, a navigation message saying "Now, you are near the designated passing point." is output. When the passing point has been passed, a message saying "Navigation is switched to one up to destination neighborhood." is output. Also, a display of this navigation content is provided. The navigation is then switched to the one up to destination neighborhood.

(Navigation concerning Arrival at Destination)

When destination neighborhood is approached, ending navigation is provided by a navigation message. More specifically, when the destination that has been set is approached by the vehicle, a message saying "You are in the destination neighborhood, and this is an ending navigation message." is output, thus bringing an end to the navigation.

Figure 33:
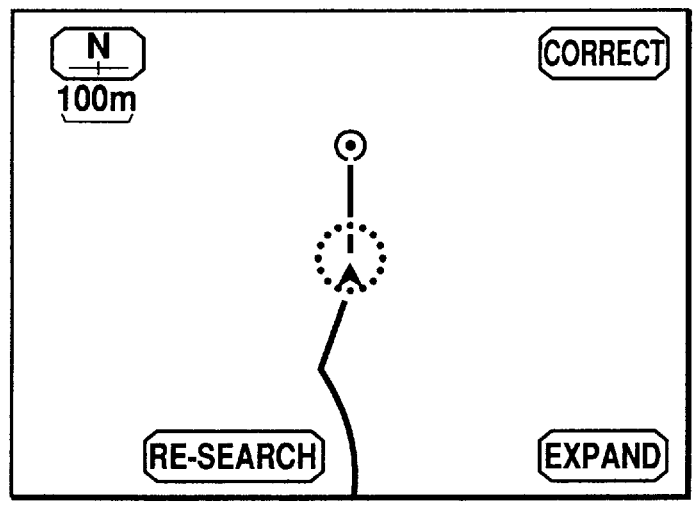
FIG. 33 is a view showing a destination arrival guide display.

At this time, if the destination can not be displayed on the displayed map, a message that "You can confirm destination on a wide area map." is displayed on the display. When this message is displayed, the destination can be confirmed with a wide area map displayed by a map area expanding operation. A display on which arrival at the destination is determined is shown in FIG. 33. When the destination is not shown in the display, a message that it is desired to confirm the destination on an expanded area map is displayed.

When a ferry stop is detected, arrival at the ferry stop is informed by a navigation message, and then the navigation message is interrupted.

(Other Functions)

(Map Movement)

By touching a position of a displayed map, the vicinity of that position is moved to the center of the display. Thus, a desired portion of display can be brought to the center thereof. When it is desired to obtain display of a map located adjacent to a prevailing display, the edge of the display is touched on the desired side. By so doing, the map display can be realized.

(Map inversion)

A displayed map can be inverted by touching a bearing display on it. That is, a map displayed with the north shown upward is inverted to one with the north shown downward.

(Display Switching during Running)

A map display which is too detailed can not be seen during running. Accordingly, during display a substitute display showing main roads only is provided by automatic switching. When the vehicle is parked, the detailed map display is restored.

(Features of this Structural Example)

This example is a map call-out system for a navigation system for calling out and displaying maps concerning call subjects specified according to input information, and it features that it comprises memory means for storing map data, map call-out means for calling out map data about a call subject from the memory means, and map display means for displaying the called map, the map call-out means calling out map data of a scale suited to the display according to kind of map call-out subject, the display means displaying the call-out subject map in a scale corresponding to the subject.

Thus, in this example of a map call-out system, suited map scales are stored in the memory means in correspondence to the kinds of call-out subjects. Thus, when displaying a map corresponding to a destination in destination setting or the like, the map can be displayed in a scale suited to the subject. For example, in the case of a golfing place, a scale which permits display of the whole golfing place is set. In the case of a private house, a scale which permits sufficient specification of the private house is set. It is thus possible to avoid such a situation that it becomes impossible to obtain correct destination setting due to unnecessary operation made in map display for destination setting or similar purposes.

What is claimed is:

1. A display touch type input system for inputting information by detecting touching of a switch part of a display, comprising:

a display means for displaying a switch image in a switch display area;

a touch panel provided above the display means and having a number of reaction points, the touching of the reaction points by the operator being detected; and switch operation detecting means for setting a reaction area covering certain ones of the reaction points, the touching of the reaction area being judged to be the touching of a corresponding switch displayed on the display means;

the switch operation detecting means being configured to enlarge the reaction area in a direction towards the operator based on a distance between adjacent switches.

2. The system according to claim 1, wherein:

the switch operation detecting means includes a computer unit for performing arithmetic operations and detecting the touching of a switch from an instruction of the display of the switch on the display means and the result of detection the touching of the touch panel.

3. The system according to claim 2, wherein:

the computer unit compares a reaction area corresponding to a switch display area and a touched reaction point and judges the switch that has been touched by enlarging the reaction area when it is found as the result of comparison that a meaningless reaction point outside the reaction area has been touched.

4. The system of claim 1, wherein the display means is mounted in a vehicle including a driver's seat and the reaction area is enlarged toward the driver's seat.

5. A display touch type input system for a vehicle, said system being mounted in the vehicle and detecting information by detecting the touching of a switch part of a display, comprising:

a display means for displaying images of a normal switch operable at all times and a parking time operable switch, the operation of which is prohibited during running of the vehicle, in respective switch display areas;

a touch panel provided above the display means and having a number of reaction points, the touching of the reaction points by the operator being detected;

switch operation detecting means for setting an area covering certain ones of the reaction points, the touching of the area being judged to be the touching of a corresponding switch displayed on the display means, the touching of the switch being detected from the result of detection of the touching of the touch panel; and running condition detecting means for detecting vehicle running conditions;

the switch operation detecting means enlarging the reaction area corresponding to the normally operable switch toward the parking time operable switch in the running state of the vehicle when the parking time operable switch is displayed adjacent to the normally operable switch.

6. A display touch type input system for a vehicle, said system being mounted in the vehicle and inputting information by detecting the touching of a switch part of a display, comprising:

a display means for displaying images of a normally operable switch and a parking time operable switch, the operation of which is prohibited during running of the vehicle, in respective switch display areas;

a touch panel provided above the display means and having a number of reaction points, the touching of the reaction points by the operator being detected;

switch operation detecting means for setting an area covering certain ones of the reaction points, the touching of said area being judged to be the touching of a corresponding switch displayed on the display means, the touching of the switch being detected from the result of detection of the touching of the touch panel; and running condition detecting means for detecting vehicle running conditions;

the switch operation detecting means setting reaction points in an area including a switch display area and enlarged in the operator's eyesight direction to be a reaction area of reaction points, the touching of which is judged to be the touching of the displayed switch, and enlarges a reaction area corresponding to a normally operable switch normally operable during running of the vehicle toward a parking time operable switch when the parking time operable switch is displayed adjacent to the normally operable switch.

7. The system according to claim 6, wherein:

the switch operation detecting means includes a computer for performing arithmetic operations and detects the touching of a switch from an instruction of display of a switch on the display means and the result of detection of the touching of the touch panel.

8. A display touch type input system for inputting information by detecting touching of a switch part of a display, comprising:

a display means for displaying a switch image in a switch display area;

a touch panel provided above the display means and having a number of reaction points, the touching of the reaction points by the operator being detected; and switch operation detecting means for setting a reaction area covering certain ones of the reaction points, the touching of the reaction area being judged to be the touching of a corresponding switch displayed on the display means;

the switch operation detecting means being configured to enlarge the reaction area only in a direction towards the operator, wherein the switch operation detection means is configured to enlarge the reaction area before the touch panel is touched by the operator.

9. A display touch type input system, comprising:

a display means for displaying a switch image in a switch display area;

a touch panel provided above the display means and having meaningful and meaningless reaction points, the touching of the meaningful and meaningless reaction points by the operator being detected; and switch operation detecting means for setting a reaction area covering certain ones of the reaction points, the touching of the reaction area being judged to be the touching of a corresponding switch displayed on the display means, wherein the switch operation detecting means forms an enlarged reaction area by enlarging the reaction area in response to the touching of meaningless reaction points.

10. The system of claim 9, wherein the enlarged reaction area extends beyond the switch display area on only two sides.

11. A display touch type input system, comprising:

a display means for displaying a switch image in a switch display area;

a touch panel provided above the display means and having a plurality of reaction points, the touching of the reaction points by the operator being detected; and switch operation detecting means for setting a reaction area covering certain ones of the reaction points, the touching of the reaction area being judged to be the touching of a corresponding switch displayed on the display means, wherein the switch operation detecting means forms an enlarged reaction area by enlarging the reaction area based on the position of the operator relative to the display means.

12. The display touch type input system of claim 11, wherein the display means in mounted in a vehicle.

* * * * *